(12) United States Patent
Zheng et al.

(10) Patent No.: US 11,152,028 B2
(45) Date of Patent: Oct. 19, 2021

(54) MULTIPLEXING METHOD FOR INCREASING STORAGE CAPACITY IN DISC-TYPE HOLOGRAPHIC STORAGE MEDIUM

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: AMETHYSTUM STORAGE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/134,928

(22) Filed: Dec. 28, 2020

(65) Prior Publication Data
US 2021/0201949 A1    Jul. 1, 2021

(30) Foreign Application Priority Data
Dec. 31, 2019   (CN) .......................... 201911422780.8

(51) Int. Cl.
*G11B 7/0065* (2006.01)
*G11B 7/08* (2006.01)
*G03H 1/26* (2006.01)

(52) U.S. Cl.
CPC ............. *G11B 7/083* (2013.01); *G03H 1/265* (2013.01); *G11B 7/0065* (2013.01)

(58) Field of Classification Search
CPC ........ G11B 7/0065; G11B 2007/00653; G11B 2007/00656; G11B 2220/2504; G11B 5/89; H04N 5/91
USPC ........................................................ 360/103
See application file for complete search history.

(56) References Cited

U.S. PATENT DOCUMENTS

2009/0202919 A1 *   8/2009  Waldman ............... B82Y 10/00
                                                    430/2

* cited by examiner

*Primary Examiner* — Nabil Z Hindi
(74) *Attorney, Agent, or Firm* — Muncy, Geissler, Olds & Lowe, P.C.

(57) ABSTRACT

The present invention relates to the technical field of holographic multiplexing storage, and in particular, to a multiplexing method for increasing storage capacity in a disc-type holographic storage medium. According to the method disclosed by the present invention, holograms with different grating vector directions can be overwritten and recorded in the same storage medium according to Bragg selection characteristics of volume holographic records, and the obtained holograms do not affect each other. According to the method disclosed by the present invention, on the premise of ensuring low crosstalk between data pages, the multiplexing number of shift multiplexing storage is increased by using a cross-shift multiplexing method, and the storage density is improved.

17 Claims, 6 Drawing Sheets

MULTIPLEXING METHOD FOR INCREASING STORAGE CAPACITY IN DISC-TYPE HOLOGRAPHIC STORAGE MEDIUM

CROSS REFERENCE TO RELATED APPLICATIONS

The present application claims priority from Chinese Patent Application No. 201911422780.8 filed on Dec. 31, 2019, all of which are hereby incorporated herein by reference.

TECHNICAL FIELD

The present invention relates to the technical field of optical holographic storage, and in particular, to a multiplexing method for increasing storage capacity in a disc-type holographic storage medium.

BACKGROUND

In optical holographic storage technology, the input information is converted into a two-dimensional digital bitmap and loaded into the signal light beam. The modulated signal beam and the reference beam interfere with each other in a photopolymer storage media, forming holograms which are stored in the form of refractive index changes of the storage media. The information can be read out through a reproduction procedure where the holograms are illuminated by a reproducing reference beam. Benefit from the large storage capacity, long storage life time, high transfer rate, etc., the optical holographic storage technology has become a promising candidate for long term information storage.

At present, the multiplexing methods for recording and reproduction mainly include (1) angular multiplex recording, (2) collinear multiplex recording, and (3) spherical reference light shift multiplex recording.

In method (1), the multiplexed recording of holograms is performed by changing the incident angle of reference light. In this method, the Bragg diffraction condition can only be met in a very narrow angular range. For example, one hologram is recorded every time the incident angle of the reference light changes by about 0.1 degree, so hundreds of holograms can be recorded at the same position. Because this method requires the medium to move so as to ensure that a series of new holograms are re-recorded at other positions where the holograms do not overlap with the previous holograms, the storage capacity is limited.

In method (2), signal light is coaxial with reference light, and the reference light is subjected to phase or amplitude speckle modulation. In the recording process of holograms, each recorded hologram can only move a small distance relative to the previous hologram, and it is not necessary to ensure that the hologram in each position does not overlap with the holograms in other positions, for example, each recorded hologram can move 2 or 3 μm in a two-dimensional plane. However, this method cannot be used with angle multiplex recording, and the storage capacity is still limited.

Figure 1:
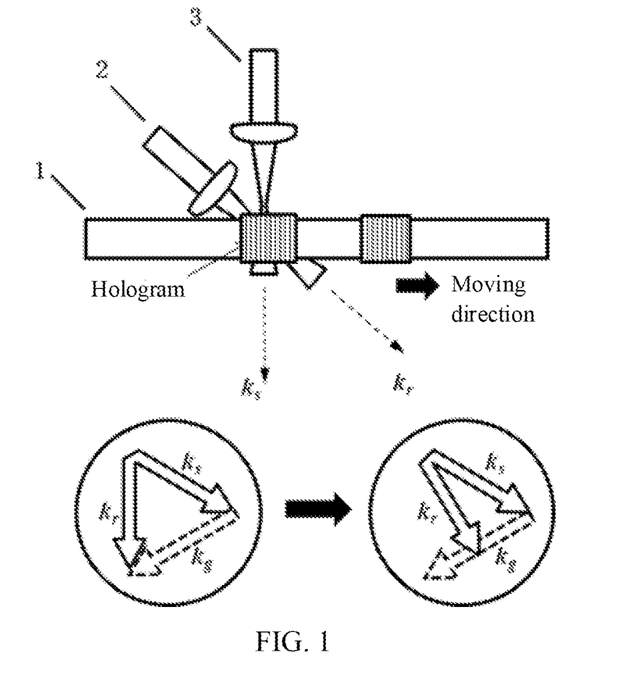
FIG. 1 illustrates the principle of a shift multiplex recording method.

In method (3), a spherical wave is used as reference light, and a new hologram can be recorded by moving the medium a certain distance. As shown in FIG. 1, according to the Bragg condition, the signal light wave vector $k_s$, the reference light wave vector $k_r$, and the holographic grating vector $k_g$ form a vector triangle. When the medium is moved a short distance after the hologram is recorded, the three vectors no longer form a triangle, the Bragg condition no longer holds, and the original recorded hologram cannot be reproduced, so the next hologram can be recorded.

Reasons for adopting spherical reference light shift multiplex recording are: (1) in angular multiplex recording, different holograms are overlapped and recorded in the same position, and the signal light or reference light of the current hologram may be scattered by the previously recorded hologram, and moreover, the cross-writing method may also produce noise and reduce the signal-to-noise ratio; and (2) in the coaxial holographic method, because the signal light and the reference light are close to each other, a greater crosstalk may be produced, and the signal-to-noise ratio is reduced, making the signal quality worse. Due to these two reasons, a spherical reference beam is adopted to avoid the impact of these noises and improve the diffraction efficiency, thereby increasing the multiplexing number of holographic recording. In this method, the Bragg condition determines the moving direction and the moving distance of shift multiplexing. Therefore, a new hologram can be recorded only by moving 2-5 μm. However, in the direction perpendicular to the movement, shift multiplexing is not controlled by the Bragg condition and generally requires a displacement of 300-600 μm. Therefore, shift multiplex recording alone cannot significantly increase the storage capacity.

SUMMARY

The present invention aims to overcome at least one defect (deficiency) of the prior art, and provides a multiplexing method for increasing storage capacity in a disc-type holographic storage medium, so as to increase the storage capacity.

The technical solution adopted by the present invention is a multiplexing method for increasing storage capacity in a disc-type holographic storage medium, which is a cross-shift multiplex recording and reproducing method, including the following steps:

S1. forming a holographic field at a recording position in the storage medium by a reference beam and a signal beam carrying information, so as to record signal information;

S2. using a linear shift multiplexing method, and repeating the process of step (1) to perform shift multiplexing recording on the entire storage medium; and S3. changing the relative orientation between the center of the storage medium and an optical head, and repeating steps (1) and (2) to record holograms with different grating vector directions at the same position on the storage medium;

S4. performing multiplex recording by using the circumferential rotation of the storage medium, and performing multiplex recording on two positions on the surface of the storage medium that are symmetrical around the center of a circle to obtain holograms with different grating vector directions; and S5. using the same beam of reference light to read the input signal information at the corresponding recording position.

S1-S4 in the steps are the multiplex recording process, and S5 is the reproduction process. The multiplexing method may also include only a multiplex recording method.

With the method of the present invention, holograms with different grating vector directions are recorded at the same position on the storage medium. Even if the holograms overlap each other, no crosstalk occurs due to different grating vector directions. Not only the storage capacity increases, but also the signal-to-noise ratio is higher.

Specifically, the linear shift multiplexing method in step S2 includes: translating the storage medium from inside to outside or from outside to inside to form a plurality of translation units, where each translation unit consists of a plurality of grating vectors spaced at the same distance, and the directions of the grating vectors of each translation unit are the same; and rotating the storage medium in a counterclockwise or clockwise direction, where angles formed by any two translation units sequentially generated within one circle of rotation are equal, and the sum of the angles is 360°. That is, the position of the optical head is kept unchanged, and the cross-shift multiplexing of the entire storage medium is achieved through the translation and rotation of the storage medium.

The relative orientation between the center of the storage medium and the optical head in step S3 is achieved by fixing the position of the optical head and moving the storage medium, so that the grating vector direction changes by a fixed angle, which is called a cross angle $\alpha$, and the number of changes of the relative orientation between the center of the storage medium and the optical head is $n=[360°/\alpha]-1$; the position of the optical head forms an angle $\theta$ with the initial position of the optical head, where $\theta$ is an integer multiple of $\alpha$, and $[360°/\alpha]$ represents the rounded number of $360°/\alpha$. Holograms with opposite grating vector directions are recorded at the same position on the storage medium when the angle $\theta$ differs by 180°, That is, the position of the optical head and the shift direction of the storage medium are kept unchanged, and the vector directions of the recorded holographic gratings are changed by changing the relative orientation between the storage medium and the optical head. Consequently, the grating vectors at each position are different and they form cross angles the same as $\alpha$ with adjacent ones, so there is no information cross-talk among them.

The cross angle $\alpha$ is equal to or greater than 45°. The cross angle $\alpha$ is preferably exactly divisible by 360, which facilitates the rotation of the storage medium. The cross angle $\alpha$ is preferably 60°. In this case, in step S3, the storage medium is rotated by 60° for five times sequentially, so that the relative orientation between the optical head and the center of the storage medium is changed five times, and $\theta$ is 60°, 120°, 180°, 240° and 300°, sequentially.

In step S4 of the method of the present invention, the storage medium does not perform horizontal linear movement, but rotates in a circumferential direction. The obtained hologram grating vectors are along the circumferential normal direction, and the grating vector directions at two positions symmetrical around the center of the circle are opposite. No crosstalk occurs even if the holograms overlap with each other, thereby further increasing the storage capacity.

The storage medium is preferably an optical disc. The holographic system is preferably of an off-axis type. The reference light is preferably spherical wave.

To increase the information recording and reading speed, a position mark is provided on the surface of the storage medium, and the recording and reproduction of the holograms takes the position mark as a starting point for linear shift multiplexing and circumferential rotation multiplexing.

To quickly find the position mark, a guide groove is set on the substrate of the storage medium, the position mark is placed in the guide groove. A servo error signal for positioning control of the optical head is obtained through the guide groove, by which the optical head moves along the guide groove and detects the position of the mark. position mark The present invention also provides a disc-type storage medium, including a plurality of translation units, where each translation unit consists of a plurality of grating vectors spaced at the same distance, and the directions of the grating vectors of each translation unit are the same. And in the projection of each translation unit on the surface of the storage medium, there are holograms with different grating vector directions at the same position.

To facilitate recording and reading, a position mark is provided on the surface of the storage medium, and the projections of two-dimensional hologram arrays on the surface of the storage medium are from outside to inside or from inside to outside in the grating vector direction at the same position mark, and the grating vectors at the same position mark form a fixed angle $\alpha$, which is equal to or greater than 45°. $\alpha$ is preferably exactly divisible by 360, and is preferably 60°.

The present invention also provides a disc-type holographic storage medium recording and reproducing device for recording and reproducing a stored signal on a storage medium, including: a recording mechanism, configured to generate signal light and reference light, where the signal light and the reference light interfere with each other in the storage medium to generate holograms; a translation mechanism, configured to drive the storage medium to translate from inside to outside or from outside to inside; and a rotating mechanism, configured to drive the storage medium to rotate with respect to the center of the storage medium, where the translational motion and the rotational motion of the storage medium enable the recording mechanism to perform linear shift multiplexing and circumferential shift multiplexing on the storage medium, so that holograms with different grating vector directions can be recorded at the same position on the storage medium.

The disc-type holographic storage medium recording and reproducing device further includes an optical head positioning mechanism, configured to quickly locate the position of the optical head to increase the recording and reading speed.

Moreover, a position mark is provided on the storage medium, and the recording and reproduction of the holograms takes the position mark as a starting point. A guide groove is formed on the substrate of the storage medium, and a servo error signal for positioning control of the optical head is obtained through the guide groove, so that the optical head follows the guide groove, and detects the position mark in the guide groove.

The translation mechanism moves the storage medium to change the relative orientation between the center of the storage medium and the optical head, so that the grating vector direction of the hologram changes by a fixed angle $\alpha$, the position of the optical head forms an angle $\theta$ with the initial position of the optical head, $\theta$ is an integer multiple of $\alpha$, and the recording mechanism records holograms with opposite grating vector directions at the same position on the storage medium when the angle $\theta$ differs by 180°; and the number of times the rotating mechanism can rotate at the fixed angle $\alpha$ is $n=[360°/\alpha]-1$, where $[360°/\alpha]$ is the rounded number of $360°/\alpha$, and $\alpha$ is equal to or larger than 45°. $\alpha$ is preferably exactly divisible by 360, and is preferably 60°.

Compared with the prior art, the present invention has the following beneficial effect: The multiplexing method of the present invention can increase the storage capacity while maintaining the signal-to-noise ratio. Holograms with different grating vector directions are recorded at the same position on the storage medium. Even if the holograms overlap with each other, no crosstalk occurs due to the distinguished grating vector directions. Moreover, a position mark is provided on the storage medium, a guide groove is formed on the substrate of the storage medium, and a servo error signal for positioning control of the optical head is obtained through the guide groove, by which the optical head follows the guide groove and detects the position mark. The recording and reading speed is further increased.

DESCRIPTION OF EMBODIMENTS

The accompanying drawings of the present invention are only for exemplary description and cannot be construed as limiting the present invention. To better illustrate the following embodiments, some components in the accompanying drawings may be omitted, enlarged or downscaled, and do not represent the size of the actual product. For a person skilled in the art, it can be understood that some well-known structures and descriptions thereof in the accompanying drawings may be omitted.

Embodiment 1

This embodiment provides a multiplexing method for increasing storage capacity in a disc-type holographic storage medium. The storage medium is an optical disc. A holographic system is preferably of an off-axis type. A spherical wave is preferably reference light. The multiplexing method includes the following steps.

S1 Form a holographic field at the recording position in the storage medium by a reference beam and a signal beam, so as to record signal information.

S2. Use a linear shift multiplexing method, and repeat the process of step S1 to perform shift multiplex recording on the entire storage medium.

S3. Change the relative orientation between the center of the storage medium and an optical head, and repeat steps S1 and S2 to record holograms with different grating vector directions at the same position on the storage medium.

The linear shift multiplexing method in step S2 includes: translating the storage medium from inside to outside or from outside to inside to form a plurality of translation units, where each translation unit consists of a plurality of grating vectors spaced at the same distance, and the directions of the grating vectors of each translation unit are the same; and rotating the storage medium in a counterclockwise or clockwise direction, where angles formed by any two translation units sequentially generated within one circle of rotation are equal, and the sum of the angles is 360°. That is, the position of the optical head is kept unchanged, and the cross-shift multiplexing is achieved through the horizontal moving and rotation of the storage medium.

The relative orientation between the center of the storage medium and the optical head in step S3 is achieved by fixing the position of the optical head and moving the storage medium, so that the grating vector direction changes by a fixed angle, which is called a cross angle α, and the number of changes of the relative orientation between the center of the storage medium and the optical head is n=[360°/α]−1; the position of the optical head forms an angle θ with the initial position of the optical head, where θ is an integer multiple of α, [360°/α] is the rounded number of 360°/α. Holograms with opposite grating vector directions are recorded at the same position on the storage medium when the angle θ differs by 180°. That is, the position of the optical head and the shift direction of the storage medium are kept unchanged, and the vector directions of the recorded holographic gratings are changed by changing the initial relative orientation between the optical disc and the optical head. Consequently, the grating vectors at each position are different and they form cross angles the same as α with adjacent ones, so there is no information cross-talk among them.

The cross angle α is equal to or greater than 45°. The cross angle α is preferably exactly divisible by 360, which facilitates the rotation of the storage medium. In this embodiment, the cross angle α is 60°. In step S3, the storage medium is rotated by 60° for five times sequentially, so that the relative orientation between the optical head and the center of the storage medium is changed five times, and θ is 60°, 120°, 180°, 240° and 300°, sequentially. Up to six times of multiplexing are allowed in the optical disc.

Figure 2:
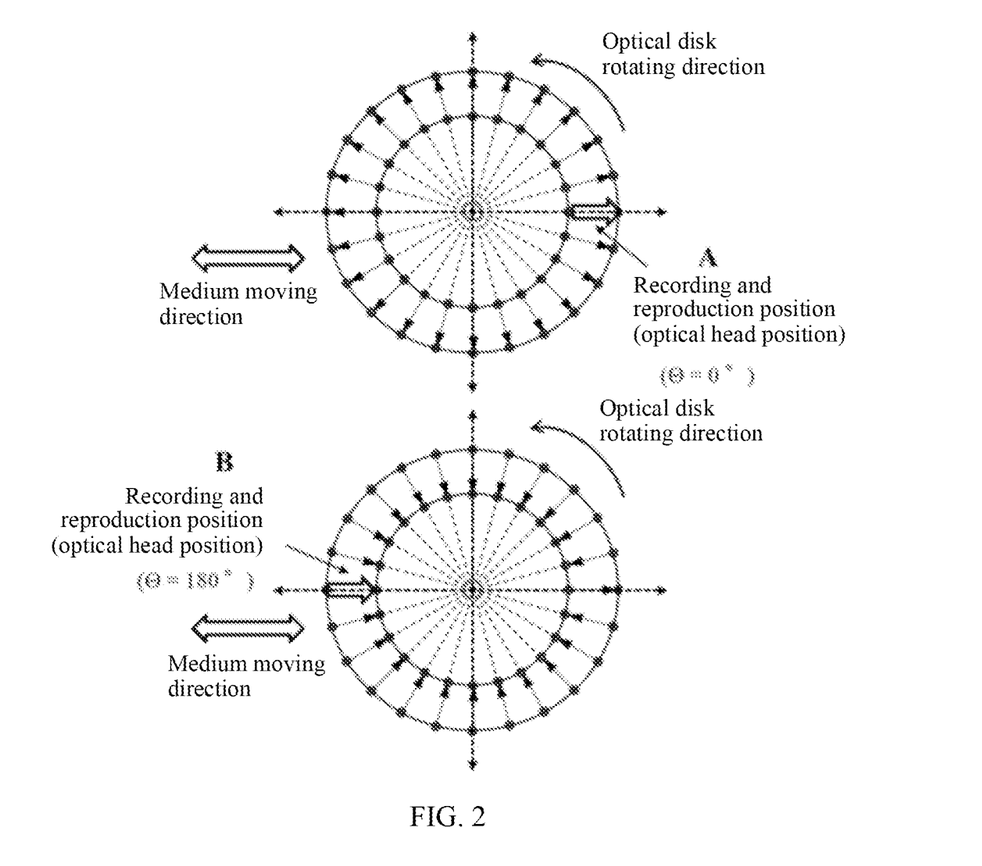
FIG. 2 is a schematic diagram of a cross-shift multiplexing method on an optical disc medium (θ=0°, 180°).
Figure 3:
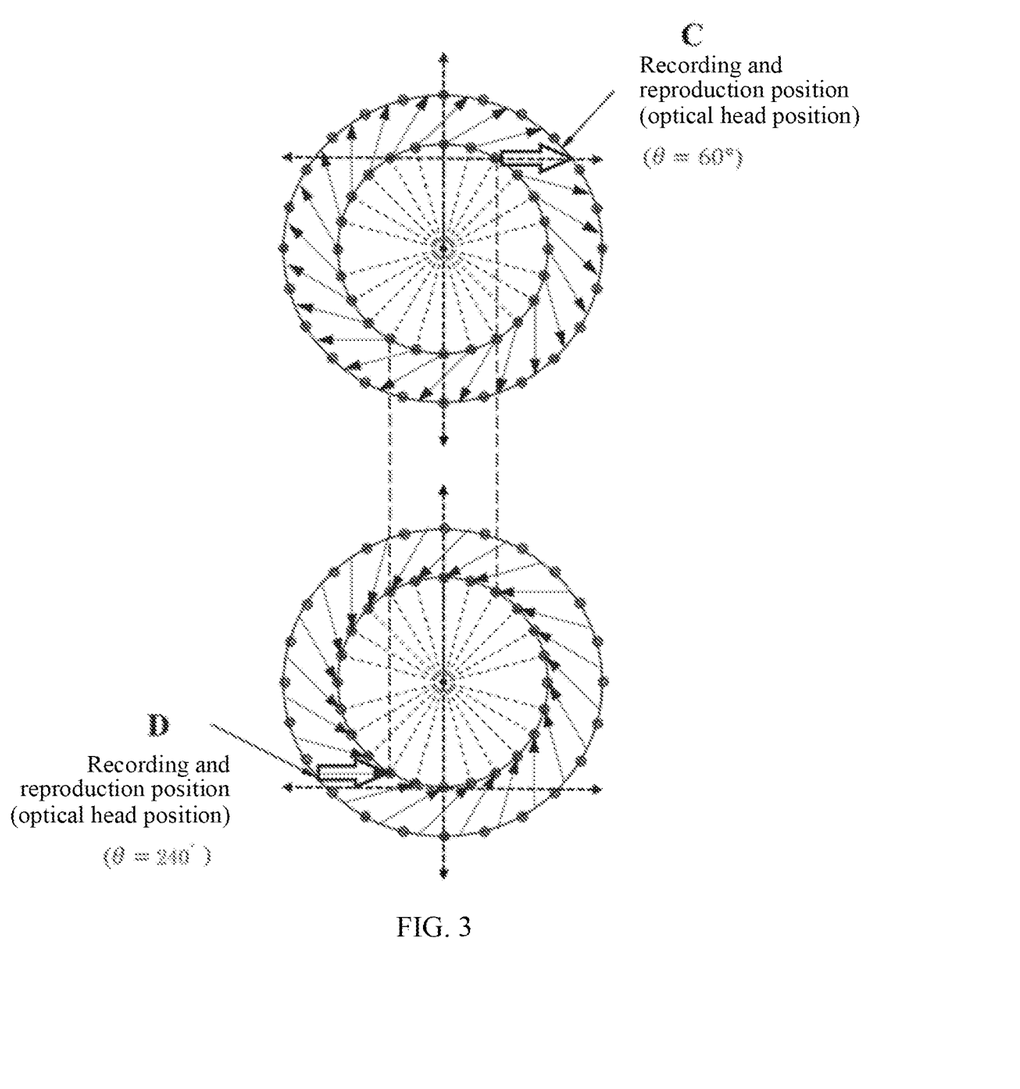
FIG. 3 is a schematic diagram of a cross-shift multiplexing method on an optical disc medium (θ=60°, 240°).
Figure 4:
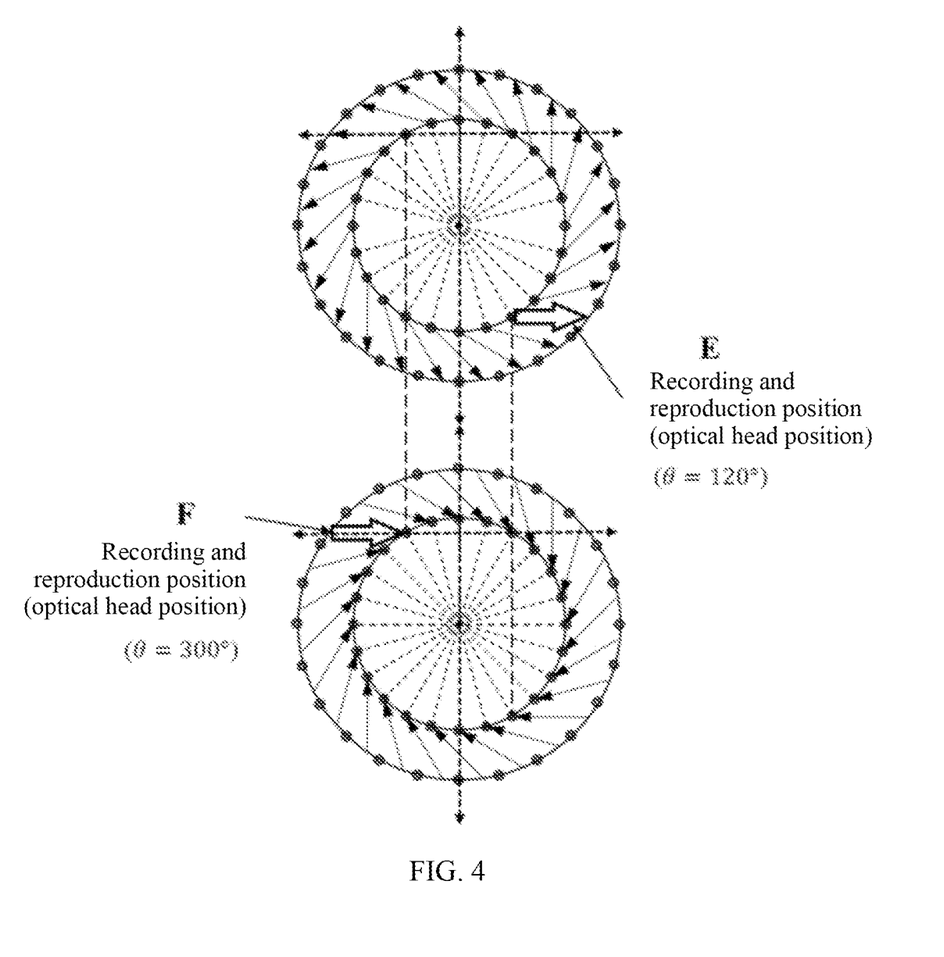
FIG. 4 is a schematic diagram of a cross-shift multiplexing method on an optical disc medium (θ=120°, 300°).

FIGS. 2-4 specifically describe the multiplexing method described in this embodiment. FIG. 2 describes shift multiplexing manner at A (the initial position, i.e., θ=0) and B (θ=180°), and it can be seen that because the grating vectors of these holograms at the same position are of opposite directions, no crosstalk occurs even if the holograms overlap. The multiplexing method is described as follows by taking A as an example. A storage medium 1 is moved to align point A with the optical head, the storage medium 1 starts to move linearly in the horizontal direction for shift multiplex recording, then the optical disc is rotated for re-recording. In this way, holograms carrying information can be stored in the entire medium, and the grating vector directions of all holograms face outward along the radial direction of the optical disc. When shift multiplexing is performed at B, the grating vector directions of the recorded holograms face inward along the radial direction of the optical disc. As shown in FIG. 2, the holograms respectively recorded at A and B have opposite grating vector directions. Therefore, no crosstalk occurs even if the holograms recorded at the same position overlap each other.

Figure 5:
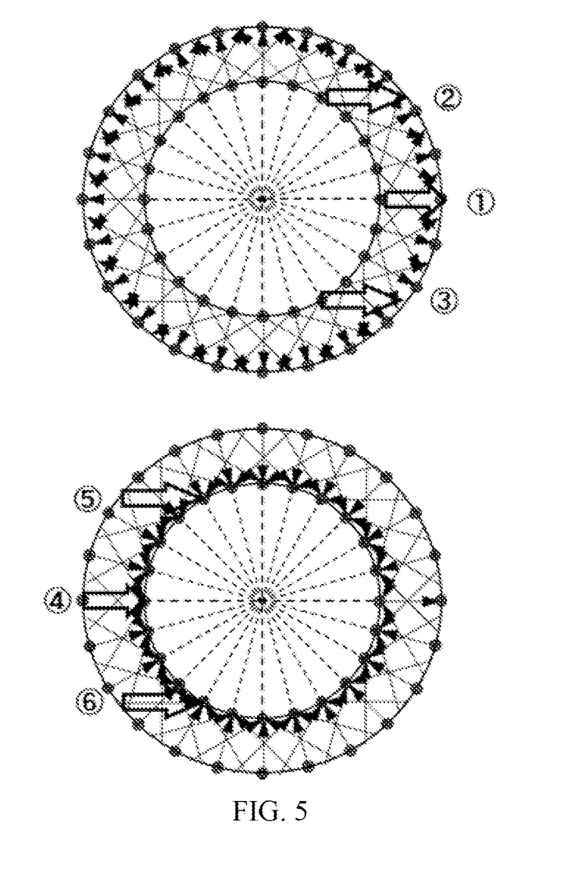
FIG. 5 is a schematic diagram of a cross-shift multiplexing method having both linear translation and optical disc rotation.

To further extend the shift multiplexing method shown in FIGS. 3 and 4, shift multiplex recording is performed at positions C (θ=60°) and D (θ=240°) in FIG. 4, and shift multiplex recording is performed at positions E (θ=120°) and F (θ=300°) in FIG. 5. The shift multiplex recording method is the same as that in FIG. 2. Such a storage method that can realize the mutual superposition of shift multiplexing in different directions is called a cross-shift multiplexing method. The results obtained by performing shift multiplexing at the above six positions A to F using this method are shown in FIG. 5. It can be seen from the results shown in FIG. 5 that the grating vector directions of the holograms are different at different positions, and even at the same position, the grating vector directions of the holograms are different.

The method of this embodiment further includes step S4, performing circumferential shift multiplex recording by using the circumferential rotation of the storage medium, and performing multiplex recording on two positions on the surface of the storage medium that are symmetrical around the disc center to obtain holograms with different grating vector directions. That is, the storage medium does not perform horizontal linear movement, but rotates in a circumferential direction. The obtained hologram grating vectors are along the circumferential normal direction, and the grating vector directions at two positions symmetrical around the center of the circle are opposite. No crosstalk occurs even if the holograms overlap each other, thereby further increasing the storage capacity.

Figure 6:
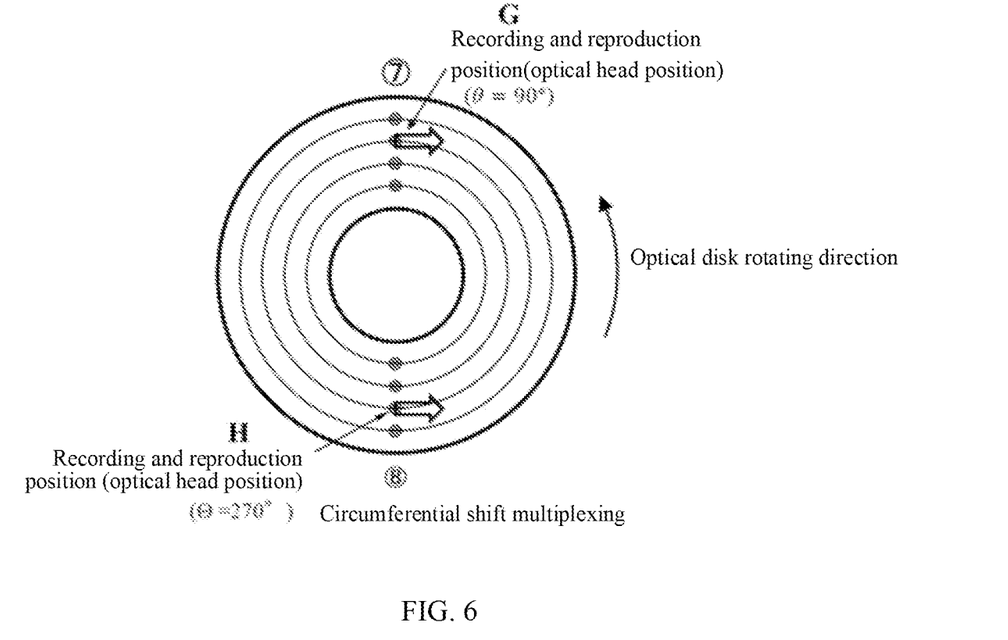
FIG. 6 is a schematic diagram of a multiplexing method for the circumferential rotation of an optical disc medium.

FIG. 6 illustrates a schematic diagram of performing the circumferential rotation shift multiplexing method on positions G ($\theta$=90°) and H ($\theta$=270°). The position of the optical head is fixed, and the linear movement of the optical disc is changed to the circumferential movement, and the circumferential rotation shift multiplex recording is executed twice, respectively. The circumferential rotation shift multiplex recording is performed twice at positions G and H in FIG. 6. The obtained hologram grating vectors are along the tangent direction of the circumference, and the directions thereof are opposite, and are also different from the grating vector directions of the holograms obtained by linear shift multiplexing, so no crosstalk occurs even if the holograms subjected to multiplex recording overlap each other.

By combining the linear shift multiplexing method and the circumferential shift multiplexing method, a total of eight times of multiplexing can be made in an optical disc, and the total multiplexing number of the holograms can be increased to more than 10,000 times.

In this embodiment, the starting position of the shift multiplexing is determined by the mark point on the optical disc, which can be realized by the guide groove and position mark commonly used in the optical disc. An optical disc guide groove is set on the substrate of the optical disc, and the position mark is placed in the guide groove. A servo error signal for positioning control of the optical head is obtained through the guide groove, so that the optical head follows the guide groove, and detects the mark in the guide groove. The recording and reproduction of the holograms takes the position mark as the starting point for linear shift multiplexing and circumferential rotation multiplexing.

When stored information is read, a beam of reference light can be used to read the input signal information at the corresponding recording position.

Embodiment 2

This embodiment provides a disc-type storage medium, which is an optical disc, including a plurality of translation units, where each translation unit consists of a plurality of grating vectors spaced at the same distance, and the directions of the grating vectors of each translation unit are the same; and in the projection of each translation unit on the surface of the storage medium, there are holograms with different grating vector directions at the same position.

A position mark is provided on the surface of the storage medium, and the projections of two-dimensional hologram arrays on the surface of the storage medium are from outside to inside or from inside to outside in the grating vector direction at the same position mark, and the grating vectors at the same position mark form a fixed angle $\alpha$, which is equal to or greater than 45°. In this embodiment, $\alpha$ is 60°.

The disc-type storage medium according to this embodiment can be obtained by using the method according to Embodiment 1.

Embodiment 3

Figure 7:
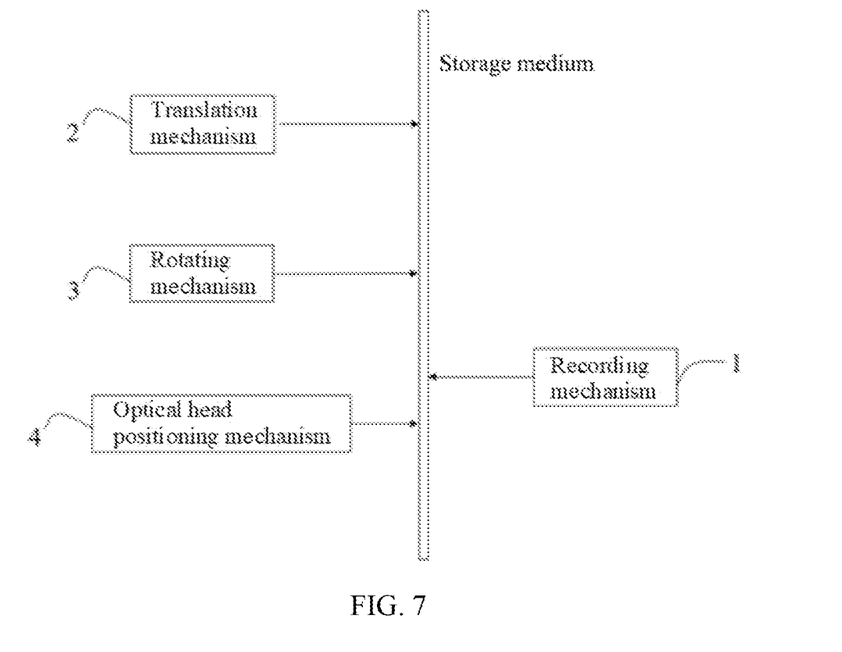
FIG. 7 is a schematic diagram of a disc-type holographic storage medium recording and reproducing device.

This embodiment provides a disc-type holographic storage medium recording and reproducing device for recording and reproducing a signal on a storage medium, as shown in FIG. 7, including: a recording mechanism, configured to generate signal light and reference light, where the signal light and the reference light interfere on the storage medium to generate holograms; a translation mechanism, configured to drive the storage medium to translate from inside to outside or from outside to inside; and a rotating mechanism, configured to drive the storage medium to rotate around the center of the storage medium, where the translational motion and the rotational motion of the storage medium enable the recording mechanism to perform linear shift multiplexing and circumferential shift multiplexing on the storage medium, so that holograms with different grating vector directions can be recorded at the same position on the storage medium.

The disc-type holographic storage medium recording and reproducing device further includes an optical head positioning mechanism, configured to locate the position of an optical head.

Accordingly, a position mark is provided on the storage medium, and the recording and reproduction of the holograms takes the position mark as a starting point. A guide groove is formed on a substrate of the storage medium, and a servo error signal for positioning control of the optical head is obtained through the guide groove, so that the optical head follows the guide groove, and detects the position mark in the guide groove.

The translation mechanism moves the storage medium to change the relative orientation between the center of the storage medium and the optical head, so that the grating vector direction of the hologram changes by a fixed angle $\alpha$, the position of the optical head forms an angle $\theta$ with the initial position of the optical head, where $\theta$ is an integer multiple of $\alpha$. The recording mechanism records holograms with opposite grating vector directions at the same position on the storage medium when the angle $\theta$ differs by 180°; and the number of times the rotating mechanism can rotate at the fixed angle $\alpha$ is n=[360°/$\alpha$]−1, where [360°/$\alpha$] is the rounded number of 360°/$\alpha$, and $\alpha$ is equal to or greater than 45° . . . $\alpha$ is preferably exactly divisible by 360, and is preferably 60° in this embodiment.

The device according to this embodiment can implement the method according to Embodiment 1, and yield the same storage medium as in Embodiment 2 after recording.

It should be noted that the above-mentioned embodiments of the present invention mainly improve the above-mentioned method or structure. For other unmentioned functions, components and structures, if necessary, components and structures in the prior art that can achieve corresponding functions can be used for implementation.

Apparently, the above-mentioned embodiments of the present invention are merely examples to clearly illustrate the technical solutions of the present invention, and are not intended to limit the specific embodiments of the present invention. Any modifications, equivalent substitutions, and improvements, etc. made within the spirit and scope of the claims of the present invention shall fall within the protection scope of the claims of the present invention.

What is claimed is:

1. A multiplexing method for increasing storage capacity in a disc-type holographic storage medium, which is a cross-shift multiplex recording and reproducing method, comprising the following steps:
   S1. forming a holographic field at a recording position in the storage medium by a reference light beam and a signal light beam carrying input information, so as to record signal information;
   S2. using a linear shift multiplexing method, and repeating the process of step S1 to perform shift multiplex recording on the entire storage medium;
   S3. changing the relative orientation between the center of the storage medium and an optical head, and repeating steps S1 and S2 to record holograms with different grating vector directions at the same position on the storage medium;
   S4. performing multiplex recording by using the circumferential rotation of the storage medium, and performing multiplex recording on two positions on the surface of the storage medium that are symmetrical around the center of a circle to obtain holograms with different grating vector directions; and
   S5. using the same beam of reference light to read the input signal information at the corresponding recording position.

2. The shift multiplexing method according to claim 1, wherein the reference light is a spherical wave.

3. The shift multiplexing method according to claim 1, wherein the reference light and the signal light have an off-axis structure.

4. The multiplexing method according to claim 1, wherein a position mark is provided on the surface of the storage medium, and the recording and reproduction of the holograms takes the position mark as a starting point for linear shift multiplexing and circumferential rotation multiplex recording and reproduction.

5. The multiplexing method according to claim 4, wherein a guide groove is formed on a substrate of the storage medium, the position mark is disposed in the guide groove, and a servo error signal for positioning control of the optical head is obtained through the guide groove, so that the light beam follows the guide groove, and the position mark in the guide groove is detected.

6. A multiplexing method for increasing storage capacity in a disc-type holographic storage medium, wherein in the multiplex recording process, the method comprises the following steps:
   S1. forming a holographic field at a recording position in the storage medium by a reference light beam and a signal light beam, so as to record signal information;
   S2. using a linear shift multiplexing method, and repeating the process of step S1 to perform shift multiplex recording on the entire storage medium;
   S3. changing the relative orientation between the center of the storage medium and an optical head, and repeating steps S1 and S2 to record holograms with different grating vector directions at the same position on the storage medium.

7. The multiplexing method according to claim 6, wherein the linear shift multiplexing method in step S2 comprises: translating the storage medium from inside to outside or from outside to inside to form a plurality of translation units, wherein each translation unit consists of a plurality of grating vectors spaced at the same distance, and the directions of the grating vectors of each translation unit are the same; and rotating the storage medium in a counterclockwise or clockwise direction, wherein angles formed by any two translation units sequentially generated within one circle of rotation are equal, and the sum of the angles is 360°.

8. The multiplexing method according to claim 6, wherein the relative orientation between the center of the storage medium and the optical head in step S3 is achieved by fixing the position of the optical head and moving the storage medium, so that the grating vector direction changes by a fixed angle, which is called a cross angle $\alpha$, and the number of changes of the relative orientation between the center of the storage medium and the optical head is $n=[360°/\alpha]-1$; the position of the optical head forms an angle $\theta$ with the initial position of the optical head, $\theta$ is an integer multiple of $\alpha$, and holograms with opposite grating vector directions are recorded at the same position on the storage medium when the angle $\theta$ differs by 180°.

9. The multiplexing method according to claim 8, wherein the cross angle $\alpha$ is equal to or greater than 45°.

10. The multiplexing method according to claim 9, wherein the cross angle $\alpha$ is exactly divisible by 360.

11. The multiplexing method according to claim 10, wherein the cross angle $\alpha$ is 60°.

12. The multiplexing method according to claim 8, further comprising: S4. using the circumferential rotation of the storage medium to perform circumferential shift multiplex recording, and performing multiplex recording on two positions on the surface of the storage medium that are symmetrical around the disc center to obtain holograms with different grating vector directions.

13. A disc-type holographic storage medium recording and reproducing device for recording and reproducing a signal on a storage medium, comprising:
   a recording mechanism, configured to generate signal light and reference light, wherein the signal light and the reference light interfere in the storage medium to generate holograms;
   a translation mechanism, configured to drive the storage medium to translate from inside to outside or from outside to inside; and
   a rotating mechanism, configured to drive the storage medium to rotate about the center of the storage medium; wherein
   the translational motion and the rotational motion of the storage medium enable the recording mechanism to perform linear shift multiplexing and circumferential shift multiplexing on the storage medium, so that holograms with different grating vector directions can be recorded at the same position on the storage medium.

14. The disc-type holographic storage medium recording and reproducing device according to claim 13, further comprising an optical head positioning mechanism, configured to locate the position of the optical head.

15. The disc-type holographic storage medium recording and reproducing device according to claim 14, wherein a position mark is provided on the storage medium, and the recording and reproduction of the holograms takes the position mark as a starting point; a guide groove is formed on a substrate of the storage medium, and a servo error signal for positioning control of the optical head is obtained through the guide groove, so that the optical head follows the guide groove, and detects the position mark in the guide groove.

16. The disc-type holographic storage medium recording and reproducing device according to claim 13, wherein the translation mechanism moves the storage medium to change the relative orientation between the center of the storage medium and the optical head, so that the grating vector direction of the hologram changes by a fixed angle $\alpha$, the position of the optical head forms an angle $\theta$ with the initial position of the optical head, where $\theta$ is an integer multiple of $\alpha$, the recording mechanism records holograms with opposite grating vector directions at the same position on the storage medium when the angle $\theta$ differs by 180°.

17. The disc-type holographic storage medium recording and reproducing device according to claim 13, wherein the number of times that the rotating mechanism rotates at the fixed angle $\alpha$ is $n=[360°/\alpha]-1$, and $\alpha$ is equal to or greater than 45°.

* * * * *